(12) United States Patent
Al Sheikh et al.

(10) Patent No.: US 11,928,474 B2
(45) Date of Patent: Mar. 12, 2024

(54) SELECTIVELY UPDATING BRANCH PREDICTORS FOR LOOPS EXECUTED FROM LOOP BUFFERS IN A PROCESSOR

(71) Applicant: Microsoft Technology Licensing, LLC, Redmond, WA (US)

(72) Inventors: Rami Mohammad Al Sheikh, Morrisville, NC (US); Saransh Jain, Raleigh, NC (US); Michael Scott McIlvaine, Raleigh, NC (US); Daren Eugene Streett, Cary, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/832,350

(22) Filed: Jun. 3, 2022

(65) Prior Publication Data

US 2023/0393853 A1 Dec. 7, 2023

(51) Int. Cl.
*G06F 9/38* (2018.01)
*G06F 9/32* (2018.01)

(52) U.S. Cl.
CPC ............ *G06F 9/3844* (2013.01); *G06F 9/325* (2013.01); *G06F 9/381* (2013.01)

(58) Field of Classification Search
CPC ........ G06F 9/381; G06F 9/3844; G06F 9/325; G06F 9/3806
USPC .................................................. 712/240, 241
See application file for complete search history.

(56) References Cited

U.S. PATENT DOCUMENTS

| | | | | |
|---|---|---|---|---|
| 5,175,827 A | * | 12/1992 | Morisada .............. | G06F 9/3844 712/240 |
| 6,055,629 A | * | 4/2000 | Kulkarni ............... | G06F 9/3848 712/240 |
| 6,427,206 B1 | * | 7/2002 | Yeh ....................... | G06F 9/3844 712/240 |
| 9,639,370 B1 | | 5/2017 | Gschwind et al. | |
| 9,858,081 B2 | | 1/2018 | Heil et al. | |

(Continued)

OTHER PUBLICATIONS

Xie, Zichao, Dong Tong, and Xu Cheng. "An energy-efficient branch prediction technique via global-history noise reduction." In International Symposium on Low Power Electronics and Design (ISLPED), pp. 211-216. IEEE, 2013. (Year: 2013).*

(Continued)

*Primary Examiner* — Keith E Vicary
(74) *Attorney, Agent, or Firm* — Withrow & Terranova, PLLC

(57) ABSTRACT

Selectively updating branch predictors for loops executed from loop buffers is disclosed herein. In some aspects, a branch predictor update circuit of a processor is configured to detect a loop comprising a plurality of loop instructions in an instruction stream, and to determine that the loop is stored within a loop buffer circuit of the processor. The branch predictor update circuit is further configured to determine a count of potential history register updates to the history register for the plurality of loop instructions, and to determine whether the count of potential history register updates exceeds a size of the history register. The branch predictor update circuit is also configured to, responsive to determining that the count of potential history register updates does not exceed the size of the history register, update a branch predictor of the branch predictor circuit based on the plurality of loop instructions.

20 Claims, 8 Drawing Sheets

(56) References Cited

U.S. PATENT DOCUMENTS

| | | |
|---|---|---|
| 2001/0056531 A1 | 12/2001 | Mcfarling |
| 2005/0283593 A1* | 12/2005 | Vasekin ............... G06F 9/3848 712/240 |
| 2006/0095748 A1* | 5/2006 | Yokoi .................. G06F 9/3806 712/240 |
| 2006/0190710 A1* | 8/2006 | Rychlik ............... G06F 9/3806 712/240 |
| 2012/0124344 A1* | 5/2012 | Jarvis .................. G06F 9/325 712/230 |
| 2013/0339700 A1* | 12/2013 | Blasco-Allue ......... G06F 9/325 712/241 |
| 2014/0156978 A1* | 6/2014 | Al-Otoom ............ G06F 9/3844 712/240 |
| 2015/0227374 A1* | 8/2015 | Blasco ................. G06F 9/381 712/240 |
| 2015/0309794 A1 | 10/2015 | Wilson et al. |
| 2016/0239310 A1* | 8/2016 | Billeci ................. G06F 9/3844 |
| 2021/0311744 A1 | 10/2021 | Gong et al. |
| 2021/0397455 A1 | 12/2021 | Bouzguarrou et al. |

OTHER PUBLICATIONS

Al-Khalid, et al., "Hybrid Branch Prediction for Pipelined MIPS Processor", In International Journal of Electrical and Computer Engineering, vol. 10, Issue 4, Aug. 1, 2020, pp. 3476-3482.

Seznec, André, "TAGE-SC-L Branch Predictors Again", In Proceedings of 5th JILP Workshop on Computer Architecture Competitions (JWAC-5): Championship Branch Prediction, Aug. 18, 2016, 5 Pages.

Skadron, et al., "Speculative Updates of Local and Global Branch History: A Quantitative Analysis", In Journal of Instruction-Level Parallelism, vol. 2, Jan. 2000, 23 Pages.

"International Search Report and Written Opinion Issued in PCT Application No. PCT/US23/018776", dated Jul. 7, 2023, 10 Pages. (Ms# 411455-WO-PCT).

* cited by examiner

SELECTIVELY UPDATING BRANCH PREDICTORS FOR LOOPS EXECUTED FROM LOOP BUFFERS IN A PROCESSOR

FIELD OF THE DISCLOSURE

The technology of this disclosure relates to processing of instructions for execution in a microprocessor ("processor"), and, in particular, to branch prediction of branch instructions in a processor.

BACKGROUND

Microprocessors, also referred to herein as "processors," perform computational tasks for a wide variety of applications. A conventional processor includes a central processing unit (CPU) that includes one or more processor cores, or "CPU cores." The CPU executes computer program instructions ("instructions" or "software instructions") to perform operations based on data and generate a result. The result may then be stored in a memory, provided as an output to an input/output ("I/O") device, or made available (i.e., communicated) as an input value to another instruction executed by the CPU, as non-limiting examples.

A processor may employ a processing technique known as instruction pipelining, whereby the throughput of computer instructions being executed may be increased by dividing the processing of each instruction into a series of steps which are then executed within an execution pipeline that is composed of multiple stages. Optimal processor performance may be achieved if all stages in an execution pipeline are able to process instructions concurrently and sequentially as the instructions are ordered in the execution pipeline. However, circumstances referred to as structural hazards may arise, whereby a next instruction cannot be executed without leading to incorrect computation results. For instance, a control hazard may occur as a result of execution of a branch instruction, which may redirect the path of instruction execution based on an outcome evaluated when the branch instruction is executed. When the branch instruction is encountered, the processor may need to stall the fetching of additional instructions until the branch instruction has executed, which may result in reduced processor performance and increased power consumption.

One approach for maximizing processor performance involves utilizing a branch predictor circuit to speculatively predict the path to be taken by a branch instruction (based on, e.g., the results of previously executed branch instructions), and basing the fetching of subsequent instructions on the branch prediction. When the branch instruction reaches the execution stage of the instruction pipeline and is executed, the resultant target address of the branch instruction is verified by comparing it with the previously predicted target address when the branch instruction was fetched. If the predicted and actual target addresses match (i.e., the branch prediction was correct), instruction execution can proceed without delay because the subsequent instructions at the target address will have already been fetched and will be present in the instruction pipeline. To correlate branch predictions with previously observed program behaviors, branch predictor circuits may use finite-sized history registers to track data related to, e.g., global branch history, path history, and the like.

Many conventional processors may realize further pipeline optimization and power savings by providing special handling of loops. As used herein, a "loop" refers to any sequence of instructions in the instruction pipeline whose processing is repeated sequentially in back-to-back operations. For example, loops may result from software loop constructs which are compiled into groups of instructions that are repeatedly and sequentially processed. FIG. 1 illustrates an example of an instruction stream 100 that comprises instructions that include an exemplary loop 102. The loop 102 in the example of FIG. 1 is a "while" loop that begins with a while instruction 104 that, when processed, determines whether a specified condition evaluates as true or false. If the condition of the while instruction 104 is determined to evaluate as true, instructions 106-112 in the loop 102 are executed, and will continue to be executed as a loop for as long as the condition of the while instruction 104 evaluates as true. If the condition of the while instruction 104 is determined to evaluate as false, the while instruction 104 is considered to be an exit branch instruction, and the loop 102 exits to a next instruction 114 at an exit target address.

If a loop, such as the loop 102 in FIG. 1, can be detected within an instruction pipeline, the instructions making up the loop can be captured and replayed for the number of iterations the loop is processed before exiting, without the instruction pipeline having to re-fetch and re-decode those instructions. This is because each subsequent iteration of the loop after the first iteration necessarily involves the same sequence of instructions that will have already been fetched and decoded for the first iteration of the loop. In this regard, many conventional processors provide a loop buffer circuit to detect, capture, and replay loop instructions. Power savings may be realized by deactivating or otherwise stalling the fetch and decode stages of the instruction pipeline while the loop instructions are replayed from the loop buffer.

However, the use of the loop buffer circuit may raise issues with respect to updates to branch predictors (i.e., history registers and/or branch predictor table entries) used by the branch predictor circuit. In particular, issues may arise as to whether branch predictors should be updated for branch instructions within loops that are replayed from a loop buffer circuit. For instance, in the case of history registers, conventional approaches may update a history register with new data for every branch instruction encountered, which causes older data recorded in the history register to be displaced. If a history register contains 64 bits and each branch instruction encountered inserts one (1) bit into the history register, a loop with two (2) branches per iteration will update the history register twice during each loop iteration. After 32 loop iterations, all data stored in the history register from instructions preceding the loop will be displaced by the updates performed during the loop, and consequently the branch predictor will be unable to correlate on any history preceding the loop. Moreover, because each update per loop iteration will be the same (except possibly for the last iteration), there is no way to differentiate between different loops exceeding 32 iterations (i.e., the branch predictor will be unable to differentiate between two loops where one iterated 40 times and another iterated 100 times). In the case of branch predictor table entries, repeatedly updating the branch predictor table entries for every branch instruction encountered during the loop may result in excessive power consumption with no corresponding benefit.

SUMMARY

Aspects disclosed herein include selectively updating branch predictors for loops executed from loop buffers in a processor. The processor provides a branch predictor update circuit that is configured to detect a loop, comprising a plurality of loop instructions, that is stored within a loop buffer circuit of the processor, and to determine a count of potential history register updates to a history register for the plurality of loop instructions. The count of potential history register updates in some aspects may be determined as a product of a predicted count of loop iterations, a count of one or more branch instructions within the plurality of loop instructions, and a count of bits of the history register that are updated for each of the one or more branch instructions. If the count of potential history register updates does not exceed a size of the history register, the branch predictor update circuit is configured to update a branch predictor (i.e., the history register and/or a branch predictor table entry of a branch predictor table of a branch predictor circuit of the processor) based on the plurality of loop instructions. In aspects in which the branch predictor to be updated is the history register, the branch predictor update circuit may "fast-forward" the updates to the history register by performing all updates to the history register before initiating execution of the loop from the loop buffer circuit. If the branch predictor update circuit determines that the count of potential history register updates exceeds the size of the history register, the branch predictor update circuit in some aspects may initiate execution of the loop from the loop buffer circuit without updating the branch predictor for the loop.

In aspects in which the branch predictor circuit provides multiple branch predictor tables that are associated with corresponding history registers having different sizes, it may be desirable to only update the branch predictors for branch predictor tables associated with larger history registers, while leaving the branch predictors for branch predictor tables associated with smaller history registers unchanged. In this regard, such aspects may provide that the branch predictor circuit is also configured to determine whether the size of the history register exceeds a history register size threshold, and only update the branch predictor if the size of the history register exceeds the history register size threshold.

Some aspects may provide that the branch predictor update circuit performs updates to the branch predictor for only a subset of the potential history register updates performed during loop iterations (e.g., in the case of long-running loops). In such aspects, the branch predictor update circuit may be configured to determine whether the count of potential history register updates exceeds an update count threshold. If so, the branch predictor update circuit is configured to update the branch predictor of the branch predictor circuit for only a subset of the potential history register updates. In some such aspects, the subset of potential history register updates may be determined by the equation $x+\log_{10}n-\log_{10}x$, where x is a non-zero integer representing the update count threshold and n is a non-zero integer representing the count of potential history register updates. Thus, for example, if the branch predictor to be updated is a 100-bit history register, the update count threshold is 80, each loop iteration updates 1 bit into the history register, and the count of potential history register updates is between 100 and 999, the branch predictor will be updated 81 times.

In this regard, in one exemplary aspect, a processor for selectively updating branch predictors for loops executed from loop buffers is disclosed. The processor comprises an instruction processing circuit configured to process an instruction stream comprising a plurality of instructions in an instruction pipeline, a branch predictor circuit comprising a history register, and a branch predictor update circuit. The branch predictor update circuit is configured to detect a loop comprising a plurality of loop instructions among the plurality of instructions in the instruction stream. The branch predictor update circuit is further configured to determine that the loop is stored within a loop buffer circuit of the processor. The branch predictor update circuit is also configured to determine a count of potential history register updates to the history register for the plurality of loop instructions. The branch predictor update circuit is additionally configured to determine whether the count of potential history register updates exceeds a size of the history register. The branch predictor update circuit is further configured to, responsive to determining that the count of potential history register updates does not exceed the size of the history register, update a branch predictor of the branch predictor circuit based on the plurality of loop instructions.

In another exemplary aspect, a method for selectively updating branch predictors for loops executed from loop buffers is disclosed. The method comprises detecting a loop comprising a plurality of loop instructions among a plurality of instructions in an instruction stream. The method further comprises determining that the loop is stored within a loop buffer circuit. The method also comprises determining a count of potential history register updates to a history register for the plurality of loop instructions. The method additionally comprises determining whether the count of potential history register updates exceeds a size of the history register. The method further comprises, responsive to determining that the count of potential history register updates does not exceed the size of the history register, updating a branch predictor of a branch predictor circuit based on the plurality of loop instructions.

In another exemplary aspect, a non-transitory computer-readable medium is disclosed. The non-transitory computer-readable medium stores computer-executable instructions that, when executed, cause a processor to selectively update branch predictors for loops executed from loop buffers by causing the processor to detect a loop comprising a plurality of loop instructions among a plurality of instructions in an instruction stream. The computer-executable instructions further cause the processor to determine that the loop is stored within a loop buffer circuit of the processor. The computer-executable instructions also cause the processor to determine a count of potential history register updates to a history register for the plurality of loop instructions. The computer-executable instructions additionally cause the processor to determine whether the count of potential history register updates exceeds a size of the history register. The computer-executable instructions further cause the processor to, responsive to determining that the count of potential history register updates does not exceed the size of the history register, update a branch predictor of a branch predictor circuit based on the plurality of loop instructions.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
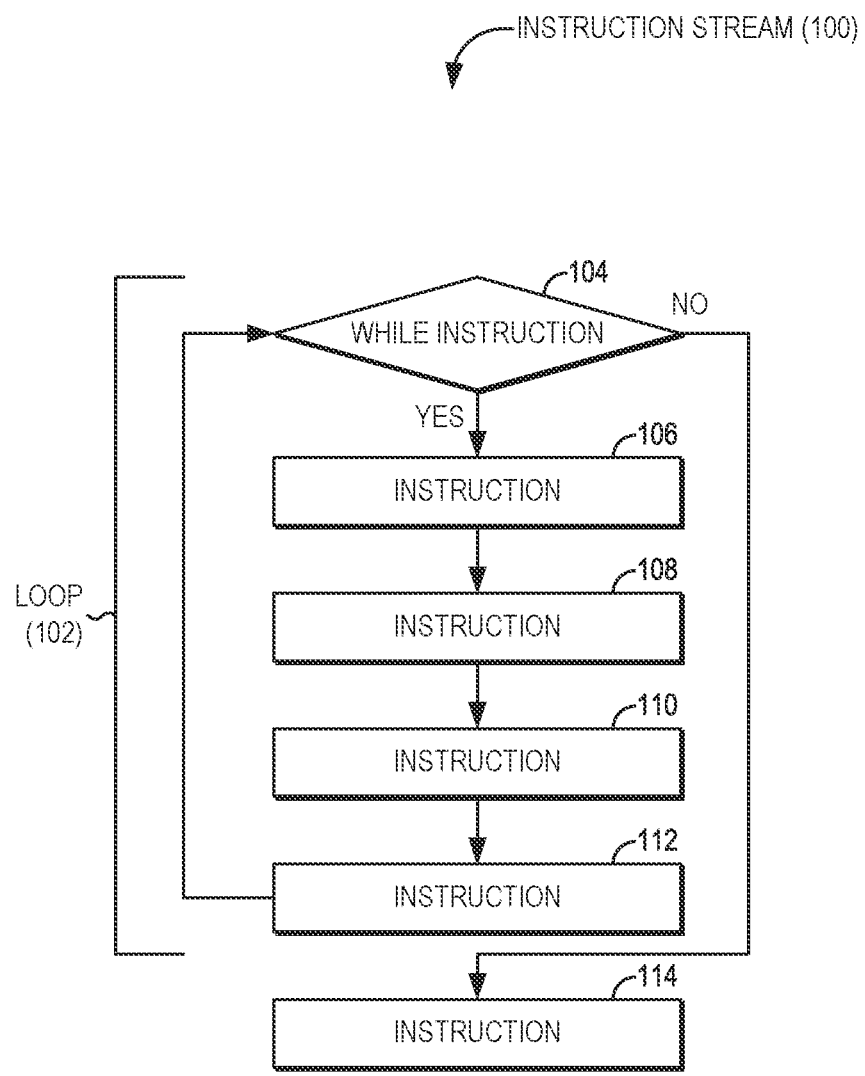
FIG. 1 is a diagram of an exemplary loop of computer program instructions in an instruction stream.
Figure 2:
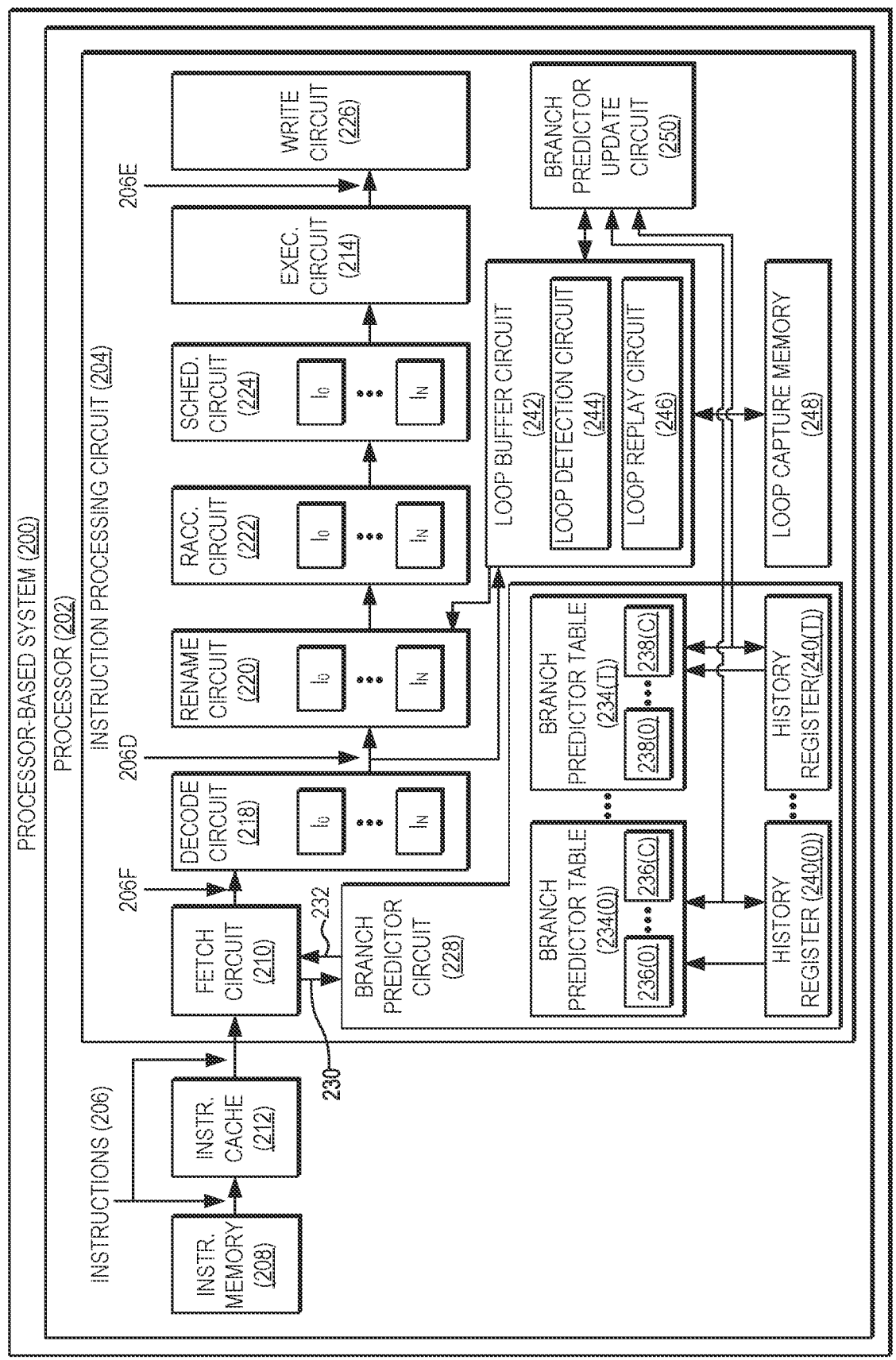
FIG. 2 is a diagram of an exemplary processor-based system that includes a processor with an instruction processing circuit that includes a branch predictor update circuit configured to selectively update branch predictors for loops executed from loop buffers.
Figure 3:
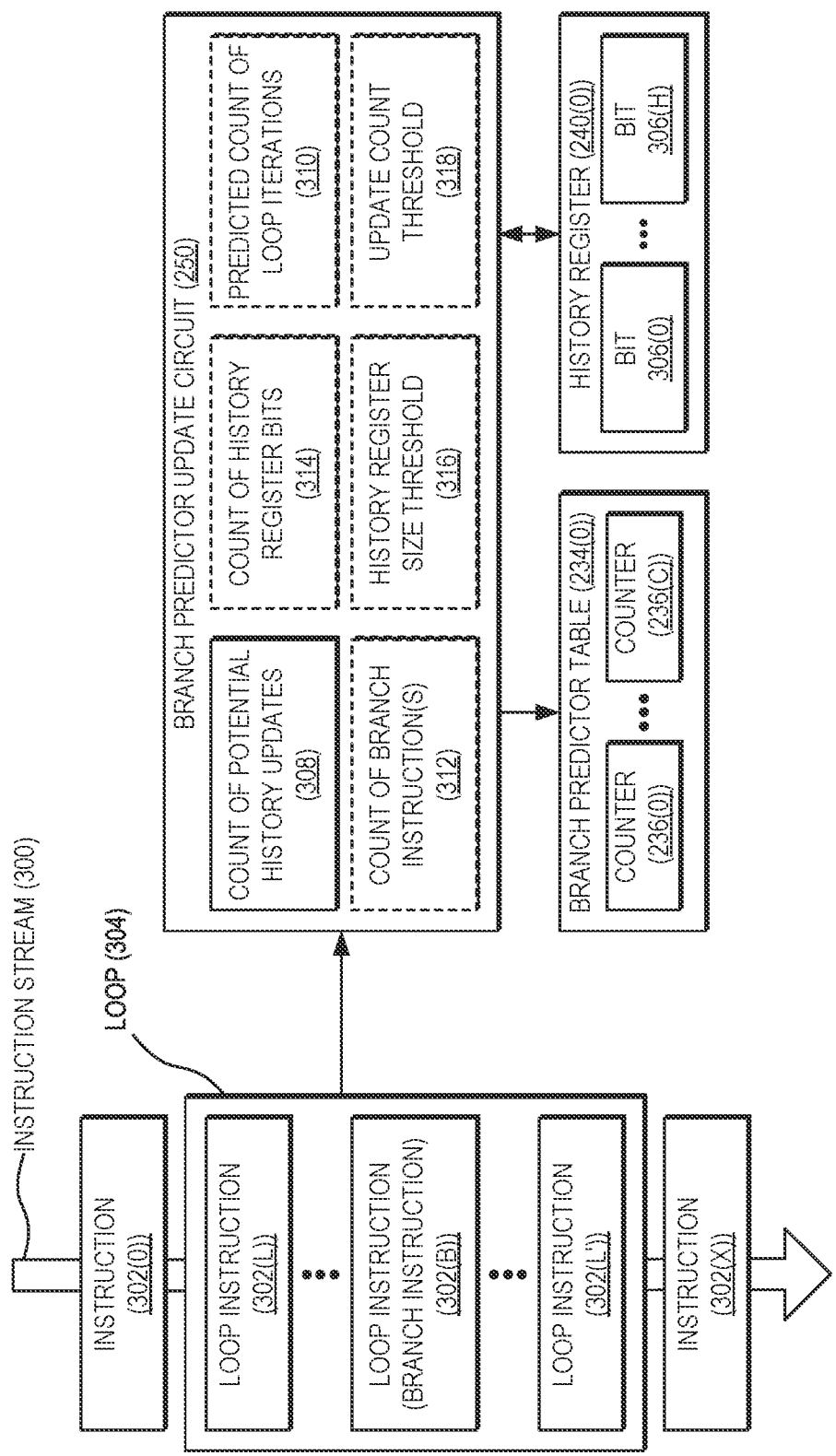
FIG. 3 illustrates exemplary aspects of the branch predictor update circuit of FIG. 2 in greater detail.
Figure 6:
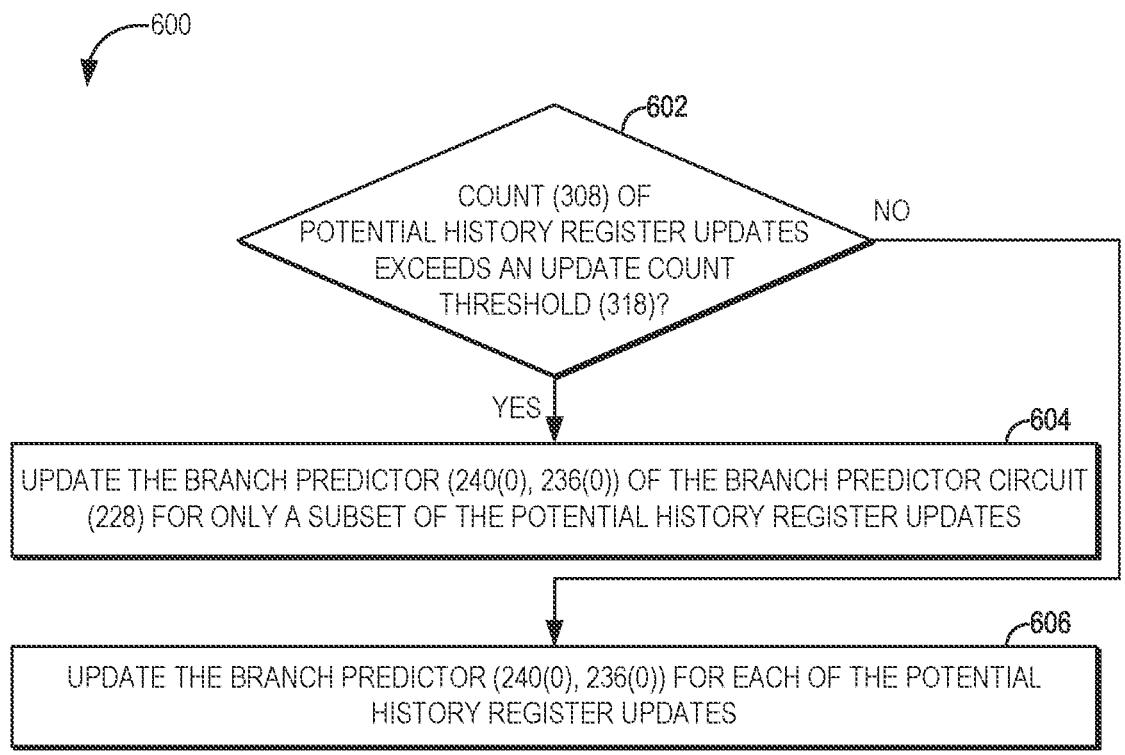
Figure 7:
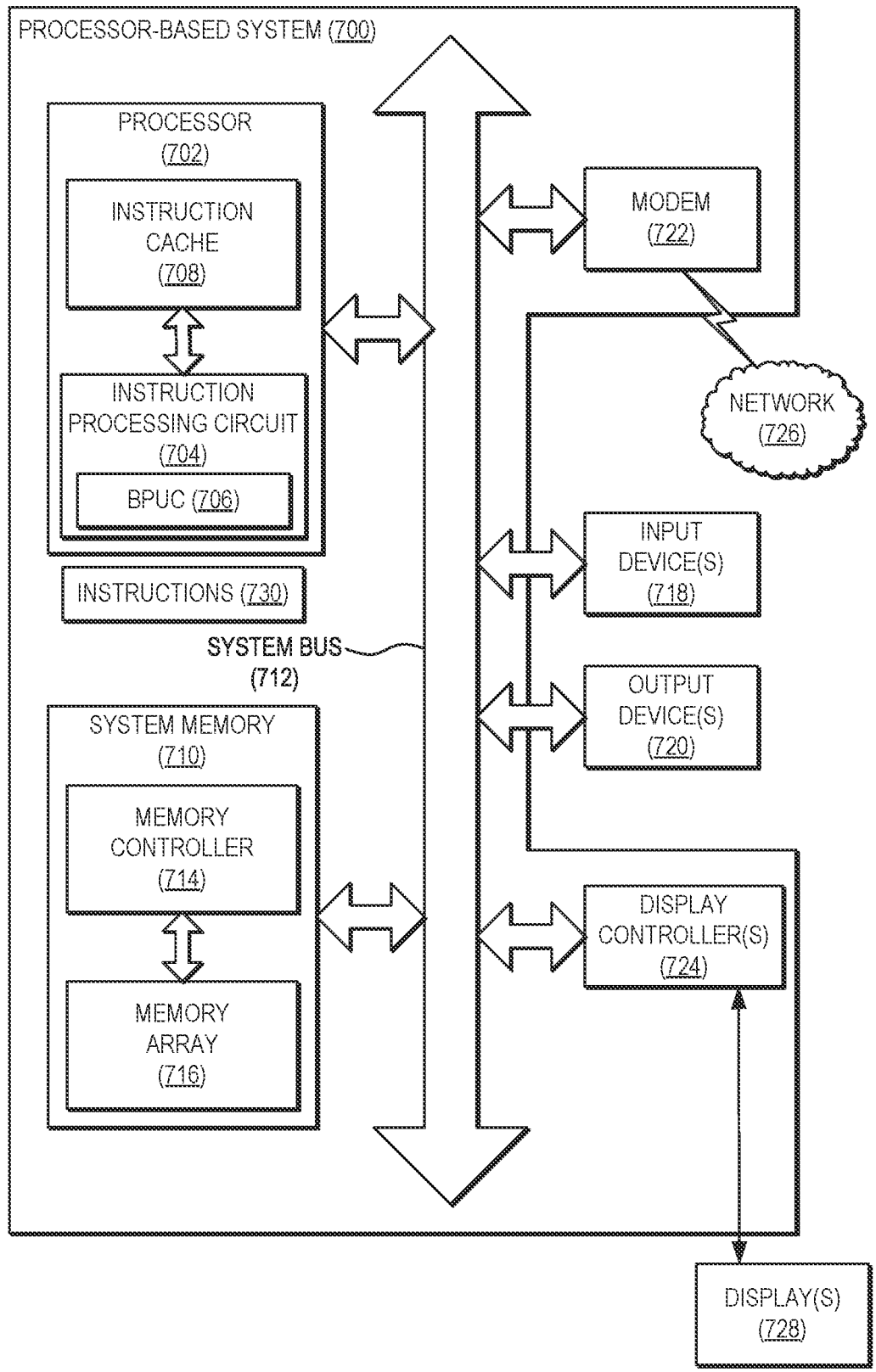

FIG. 6 is a flowchart illustrating additional exemplary operations for determining how many updates to a branch predictor should be performed by the branch predictor update circuit of FIGS. 2 and 3 in some aspects; and FIG. 7 is a block diagram of an exemplary processor-based system that includes a processor with an instruction processing circuit, such as the instruction processing circuit of FIG. 2 that includes a branch predictor update circuit for selectively updating branch predictors for loops executed from loop buffers.

DETAILED DESCRIPTION

Aspects disclosed herein include selectively updating branch predictors for loops executed from loop buffers in a processor. The processor provides a branch predictor update circuit that is configured to detect a loop, comprising a plurality of loop instructions, that is stored within a loop buffer circuit of the processor, and to determine a count of potential history register updates to a history register for the plurality of loop instructions. The count of potential history register updates in some aspects may be determined as a product of a predicted count of loop iterations, a count of one or more branch instructions within the plurality of loop instructions, and a count of bits of the history register that are updated for each of the one or more branch instructions. If the count of potential history register updates does not exceed a size of the history register, the branch predictor update circuit is configured to update a branch predictor (i.e., the history register and/or a branch predictor table entry of a branch predictor table of a branch predictor circuit of the processor) based on the plurality of loop instructions. In aspects in which the branch predictor to be updated is the history register, the branch predictor update circuit may "fast-forward" the updates to the history register by performing all updates to the history register before initiating execution of the loop from the loop buffer circuit. If the branch predictor update circuit determines that the count of potential history register updates exceeds the size of the history register, the branch predictor update circuit in some aspects may initiate execution of the loop from the loop buffer circuit without updating the branch predictor for the loop.

In aspects in which the branch predictor circuit provides multiple branch predictor tables that are associated with corresponding history registers having different sizes, it may be desirable to only update the branch predictors for branch predictor tables associated with larger history registers, while leaving the branch predictors for branch predictor tables associated with smaller history registers unchanged.

In this regard, such aspects may provide that the branch predictor circuit is also configured to determine whether the size of the history register exceeds a history register size threshold, and only update the branch predictor if the size of the history register exceeds the history register size threshold.

Some aspects may provide that the branch predictor update circuit performs updates to the branch predictor for only a subset of the potential history register updates performed during loop iterations (e.g., in the case of long-running loops). In such aspects, the branch predictor update circuit may be configured to determine whether the count of potential history register updates exceeds an update count threshold. If so, the branch predictor update circuit is configured to update the branch predictor of the branch predictor circuit for only a subset of the potential history register updates. In some such aspects, the subset of potential history register updates may be determined by the equation $x + \log_{10} n - \log_{10} x$, where x is a non-zero integer representing the update count threshold and n is a non-zero integer representing the count of potential history register updates. Thus, for example, if the branch predictor to be updated is a 100-bit history register, the update count threshold is 80, each loop iteration updates 1 bit into the history register, and the count of potential history register updates is between 100 and 999, the branch predictor will be updated 81 times.

In this regard, FIG. 2 is a diagram of an exemplary processor-based system 200 that includes a processor 202. The processor 202, which also may be referred to as a "processor core" or a "central processing unit (CPU) core," may be an in-order or an out-of-order processor (OoP), and/or may be one of a plurality of processors 202 provided by the processor-based system 200. In the example of FIG. 2, the processor 202 includes an instruction processing circuit 204 that includes one or more instruction pipelines $I_0$-$I_N$ for processing instructions 206 fetched from an instruction memory (captioned "INSTR. MEMORY" in FIG. 2) 208 by a fetch circuit 210 for execution. The instruction memory 208 may be provided in or as part of a system memory in the processor-based system 200, as a non-limiting example. An instruction cache (captioned "INSTR. CACHE" in FIG. 2) 212 may also be provided in the processor 202 to cache the instructions 206 fetched from the instruction memory 208 to reduce latency in the fetch circuit 210.

The fetch circuit 210 in the example of FIG. 2 is configured to provide the instructions 206 as fetched instructions 206F into the one or more instruction pipelines $I_0$-$I_N$ in the instruction processing circuit 204 to be pre-processed, before the fetched instructions 206F reach an execution circuit (captioned "EXEC. CIRCUIT" in FIG. 2) 214 to be executed. The instruction pipelines $I_0$-$I_N$ are provided across different processing circuits or stages of the instruction processing circuit 204 to pre-process and process the fetched instructions 206F in a series of steps that can be performed concurrently to increase throughput prior to execution of the fetched instructions 206F by the execution circuit 214.

With continuing reference to FIG. 2, the instruction processing circuit 204 includes a decode circuit 218 configured to decode the fetched instructions 206F fetched by the fetch circuit 210 into decoded instructions 206D to determine the instruction type and actions required. The instruction type and action required encoded in the decoded instruction 206D may also be used to determine in which instruction pipeline $I_0$-$I_N$ the decoded instructions 206D should be placed. In this example, the decoded instructions 206D are placed in one or more of the instruction pipelines $I_0$-$I_N$ and are next provided to a rename circuit 220 in the instruction processing circuit 204. The rename circuit 220 is configured to determine if any register names in the decoded instructions 206D should be renamed to decouple any register dependencies that would prevent parallel or out-of-order processing.

The instruction processing circuit 204 in the processor 202 in FIG. 2 also includes a register access circuit (captioned "RACC. CIRCUIT" in FIG. 2) 222. The register access circuit 222 is configured to access a physical register in a physical register file (PRF) (not shown) based on a mapping entry mapped to a logical register in a register mapping table (RMT) (not shown) of a source register operand of a decoded instruction 206D to retrieve a produced value from an executed instruction 206E in the execution circuit 214. The register access circuit 222 is also configured to provide the retrieved produced value from an executed instruction 206E as the source register operand of a decoded instruction 206D to be executed.

Also, in the instruction processing circuit 204, a scheduler circuit (captioned "SCHED. CIRCUIT" in FIG. 2) 224 is provided in the instruction pipeline $I_0$-$I_N$ and is configured to store decoded instructions 206D in reservation entries until all source register operands for the decoded instruction 206D are available. The scheduler circuit 224 issues decoded instructions 206D that are ready to be executed to the execution circuit 214. A write circuit 226 is also provided in the instruction processing circuit 204 to write back or commit produced values from executed instructions 206E to memory (such as the PRF), cache memory, or system memory.

With continuing reference to FIG. 2, the instruction processing circuit 204 also includes a branch predictor circuit 228. The branch predictor circuit 228 is configured to speculatively predict the outcome of a fetched branch instruction that controls whether instructions corresponding to a taken path or a not-taken path in the instruction control flow path are fetched into the instruction pipelines $I_0$-$I_N$ for execution. For example, the fetched branch instruction may be a branch instruction 230 that includes a condition to be resolved by the instruction processing circuit 204 to determine which instruction control flow path should be taken. In this manner, the outcome of the branch instruction 230 in this example does not have to be resolved in execution by the execution circuit 214 before the instruction processing circuit 204 can continue processing fetched instructions 206F. The prediction made by the branch predictor circuit 228 can be provided as a branch prediction 232 to the fetch circuit 210 to be used to determine the next instructions 206 to fetch as the fetched instructions 206F.

The branch predictor circuit 228 generates branch predictions such as the branch prediction 232 using a plurality of branch predictor tables 234(0)-234(T). It is to be understood that, while the branch predictor tables 234(0)-234(T) are shown in FIG. 2 as elements separate from the branch predictor circuit 228, some aspects may provide that the branch predictor tables 234(0)-234(T) are implemented as constituent elements of the branch predictor circuit 228. Each of the branch predictor tables 234(0)-234(T) stores a plurality of branch predictor table entries such as the branch predictor table entries 236(0)-236(C) and 238(0)-238(C). The branch predictor table entries 236(0)-236(C) and 238(0)-238(C) are indexable entries (e.g., indexed by a hash of a program counter of a branch instruction, branch history, and/or path history) comprising saturated counters that each represent a branch prediction as a signed value. The branch predictor circuit 228 is configured to speculatively predict the outcome of a branch instruction such as the branch instruction 230 by retrieving a counter (e.g. the branch predictor table entries 236(0) and 238(0), as non-limiting examples) from each of multiple ones of the branch predictor tables 234(0)-234(T), optionally scaling each branch predictor table entry 236(0), 238(0) by a table-specific scaling coefficient (not shown), and then summing the retrieved branch predictor table entries 236(0), 238(0) using an adder circuit (not shown). The sign of the sum of the branch predictor table entries 236(0), 238(0) then indicates the branch prediction 232.

To facilitate branch prediction by the branch predictor circuit 228, the branch predictor tables 234(0)-234(T) in the example of FIG. 2 are associated with corresponding history registers 240(0)-240(T). The history registers 240(0)-240(T) are used to capture previously observed program behavior with respect to previously encountered branches, such as global branch history, path history, and the like. The branch predictor circuit 228 may then correlate branch behavior with the contents of the history registers 240(0)-240(T) when making a branch prediction. In some aspects, the branch predictor tables 234(0)-234(T) each may be associated with corresponding history registers 240(0)-240(T) with increasing length. Thus, in such aspects, different ones of the history registers 240(0)-240(T) may have different sizes.

The instructions 206 may contain a "loop," which, as used herein, refers to a sequence of instructions 206 that are repeatedly processed sequentially in a back-to-back manner. If the instructions 206 that are part of a loop can be detected when the instructions 206 are processed within one of the instruction pipelines $I_0$-$I_N$, the instructions 206 can be captured and replayed in processing stages in the instruction pipeline $I_0$-$I_N$ without having to re-fetch and/or re-decode the instructions 206 for the subsequent iterations of the loop. In this regard, the instruction processing circuit 204 in this example includes a loop buffer circuit 242 to perform loop buffering. The loop buffer circuit 242 is configured to detect loops among the instructions 206, to capture (i.e., loop buffer) the instructions 206 in the detected loop, and to insert (i.e., replay) the captured loop instructions 206 in an instruction pipeline $I_0$-$I_N$ for subsequent iterations of the loop. In this manner, the loop buffer circuit 242 enables the instruction processing circuit to avoid or reduce the need to re-fetch the instructions 206 in the detected loop.

The loop buffer circuit 242 in the instruction processing circuit 204 of the processor 202 includes a loop detection circuit 244 and a loop replay circuit 246. The loop detection circuit 244 is configured to detect a loop among the instructions 206 to be executed. In this regard, in this example, the loop detection circuit 244 is communicatively coupled to the output of the decode circuit 218 in an instruction pipeline $I_0$-$I_N$ to receive the decoded instructions 206D. The loop detection circuit 244 is configured to receive the decoded instructions 206D and analyze the decoded instructions 206D to determine if there are any loops in the decoded instructions 206D. If the loop detection circuit 244 detects a loop in the decoded instructions 206D, the loop detection circuit 244 may provide the instructions 206D in the detected loop to a loop replay circuit 246, or may store the captured decoded instructions 206D in the detected loop in a memory structure, such as a loop capture memory 248, for example, that can be accessed by the loop replay circuit 246. The loop replay circuit 246 is configured to predict a number of full iterations of the detected loop to be executed in the instruction pipeline $I_0$-$I_N$ as a loop iteration prediction (not shown), and to predict a loop exit branch of a decoded instruction 206D of the detected loop that will result in the detected loop being exited in the instruction pipeline $I_0$-$I_N$ as a loop exit branch prediction (not shown). The loop replay circuit 246 is then configured to fully replay the detected loop in the instruction pipeline $I_0$-$I_N$ for a number of full iterations indicated by the loop iteration prediction.

However, as noted above, the use of the loop buffer circuit 242 may raise issues with respect to updates to branch predictors (i.e., the history registers 240(0)-240(T) and/or the branch predictor table entries 236(0)-236(C), 238(0)-238(C)) used by the branch predictor circuit 228 for branch instructions within loops that are replayed from the loop buffer circuit 242. Accordingly, in this regard, a branch predictor update circuit 250 of FIG. 2 is configured to selectively update branch predictors for loops executed from loop buffers. Upon detecting a loop comprising a plurality of loop instructions that is stored within the loop buffer circuit 242, the branch predictor update circuit 250 determines a count of potential history register updates to a history register (e.g., the history register 240(0) of FIG. 2) for the plurality of loop instructions. If the count of potential history register updates does not exceed a size of the history register 240(0), the branch predictor update circuit 250 is configured to update a branch predictor (i.e., the history register 240(0) and/or a branch predictor table entry such as the branch predictor table entry 236(0) of FIG. 2) based on the plurality of loop instructions. If the branch predictor update circuit 250 determines that the count of potential history register updates exceeds the size of the history register 240(0), the branch predictor update circuit 250 in some aspects may initiate execution of the loop from the loop buffer circuit 242 without updating the branch predictor for the loop. In this manner, program behavior for shorter-running loops may be used to update the branch predictor, while program history stored by the branch predictor can be preserved when longer-running loops are encountered.

To illustrate exemplary elements of and operations performed by the branch predictor update circuit 250 of FIG. 2, FIG. 3 is provided. As seen in FIG. 3, an instruction stream 300 comprising a plurality of instructions 302(0)-302(X) is being executed (e.g., by the instruction processing circuit 204 of FIG. 2). The plurality of instruction includes instructions 302(L)-302(L') (also referred to herein as "loop instructions 302(L)-302(L')"), which include a branch instruction 302(B) (also referred to herein as "branch instruction 302(B)") and which together make up a loop 304. Also shown in FIG. 3 are the branch predictor update circuit 250 of FIG. 2, the branch predictor table 234(0) of FIG. 2 (which comprises the branch predictor table entries (captioned "COUNTER" in FIG. 3) 236(0)-236(C) of FIG. 2), and the corresponding history register 240(0) of FIG. 2 (which comprises a plurality of bits 306(0)-306(H)).

In the example of FIG. 3, the branch predictor update circuit 250 detects the loop 304 and determines that the loop 304 is stored within the loop buffer circuit 242 of FIG. 3 (e.g., by monitoring or querying the loop buffer circuit 242). Upon determining that the loop 304 is stored within the loop buffer circuit 242, the branch predictor update circuit 250 determines a count 308 of potential history register updates to the history register 240(0) for the plurality of loop instructions 302(L)-302(L'). In some aspects, the branch predictor update circuit 250 determines the count 308 of potential history register updates by first determining a predicted count 310 of loop iterations of the loop 304 (e.g., by consulting the loop replay circuit 246 of FIG. 2). The branch predictor update circuit 250 further determines a count 312 of branch instructions (i.e., the branch instruction 302(B)) within the plurality of loop instructions 302(L)-302(L'). In addition, the branch predictor update circuit 250 also determines a count 314 of the bits 306(0)-306(H) of the history register 240(0) that are updated for each execution of the branch instruction 302(B). The branch predictor update circuit 250 can then calculate the count 308 of potential history register updates as a product of the predicted count 310 of loop iterations, the count 312 of the branch instruction 302(B) within the plurality of loop instructions 302(L)-302(L'), and the count 314 of the bits 306(0)-306(H) of the history register 240(0) that are updated for the branch instruction 302(B). Thus, if there are predicted to be 32 loop iterations, a single branch instruction 302(B), and one (1) bit of the bits 306(0)-306(H) of the history register 240(0) are updated for each iteration of the branch instruction 302(B), then the count 308 of potential history updates would be calculated as 32×1×1, or 32.

The branch predictor update circuit 250 next determines whether the count 308 of potential history register updates exceeds the size of the history register 240(0) (i.e., the number H+1 of bits 306(0)-306(H) of FIG. 3). If not, the branch predictor update circuit 250 updates a branch predictor of the branch predictor circuit 228 based on the plurality of loop instructions 302(L)-302(L'). In some aspects according to FIG. 3, the branch predictor may comprise the history register 240(0) that is associated with the branch predictor table 234(0). In such aspects, the branch predictor update circuit 250 may update the branch predictor by updating the history register 240(0) based on the branch instruction 302(B) within the plurality of loop instructions 302(L)-302(L'). Because each update to the history register 240(0) for the branch instruction 302(B) for each iteration of the loop 304 is the same, and the count 308 of potential history updates is calculated in advance, some aspects of the branch predictor update circuit 250 may "fast-forward" the updates to the history register 240(0) by performing all updates to the history register 240(0) before initiating execution of the loop 304 from the loop buffer circuit 242. Some aspects according to FIG. 3 may provide that the branch predictor is a branch predictor table entry such as the branch predictor table entry 236(0). Thus, according to such aspects, the branch predictor update circuit 250 may update the branch predictor by updating the branch predictor table entry 236(0) based on the branch instruction 302(B) within the plurality of loop instructions 302(L)-302(L').

In some aspects such as the example of FIG. 2, the branch predictor table 234(0) is one of a plurality of branch predictor tables 234(0)-234(T), and the history register 240(0) is one of a plurality of corresponding history registers 240(0)-240(T) having increasing history lengths (i.e., number of bits). In such aspects, it may be desirable to update the branch predictor only for branch predictor tables associated with a history register having a length greater than a history register size threshold 316, while avoiding updates to branch predictors for branch predictor tables associated with shorter history registers. Accordingly, before updating the branch predictor, the branch predictor update circuit 250 may also determine whether a size of the history register 240(0) exceeds the history register size threshold 316. If not, the branch predictor (e.g., the history register 240(0) or the branch predictor table entry 236(0), as non-limiting examples) is updated as described above.

Some aspects may provide that the branch predictor update circuit 250 performs updates to the branch predictor for only a subset of the potential history register updates to be performed during loop iterations. In such aspects, the branch predictor update circuit 250 determines the count 308 of potential history register updates, and also determines whether the count 308 of potential history register updates exceeds an update count threshold 318. If so, the branch predictor update circuit is configured to update the branch predictor of the branch predictor circuit 228 for only a subset of the potential history register updates. The update count threshold 318 may be determined based on, e.g., the number of history register updates performed per loop iteration and the length of the history register 240(0).

In some such aspects, the subset of potential history register updates may be determined by the equation $x+\log_{10}n-\log_{10}x$, where x is a non-zero integer representing the update count threshold 318 and n is a non-zero integer representing the count 308 of potential history register updates. These aspects enable the branch predictor update circuit 250 to capture all branch predictor updates due to loop-buffer-replayed branches for the first few iterations of the loop 304, while also preserving history captured prior to the loop 304 and capturing approximately how long the loop 304 iterated. Some such aspects may provide other mechanisms for determining the size of the subset of potential history register updates, such as dividing the count 308 of potential history register updates by a constant, or by applying other logarithmic or exponential functions to determine the size of the subset of potential history register updates.

Figure 4A:
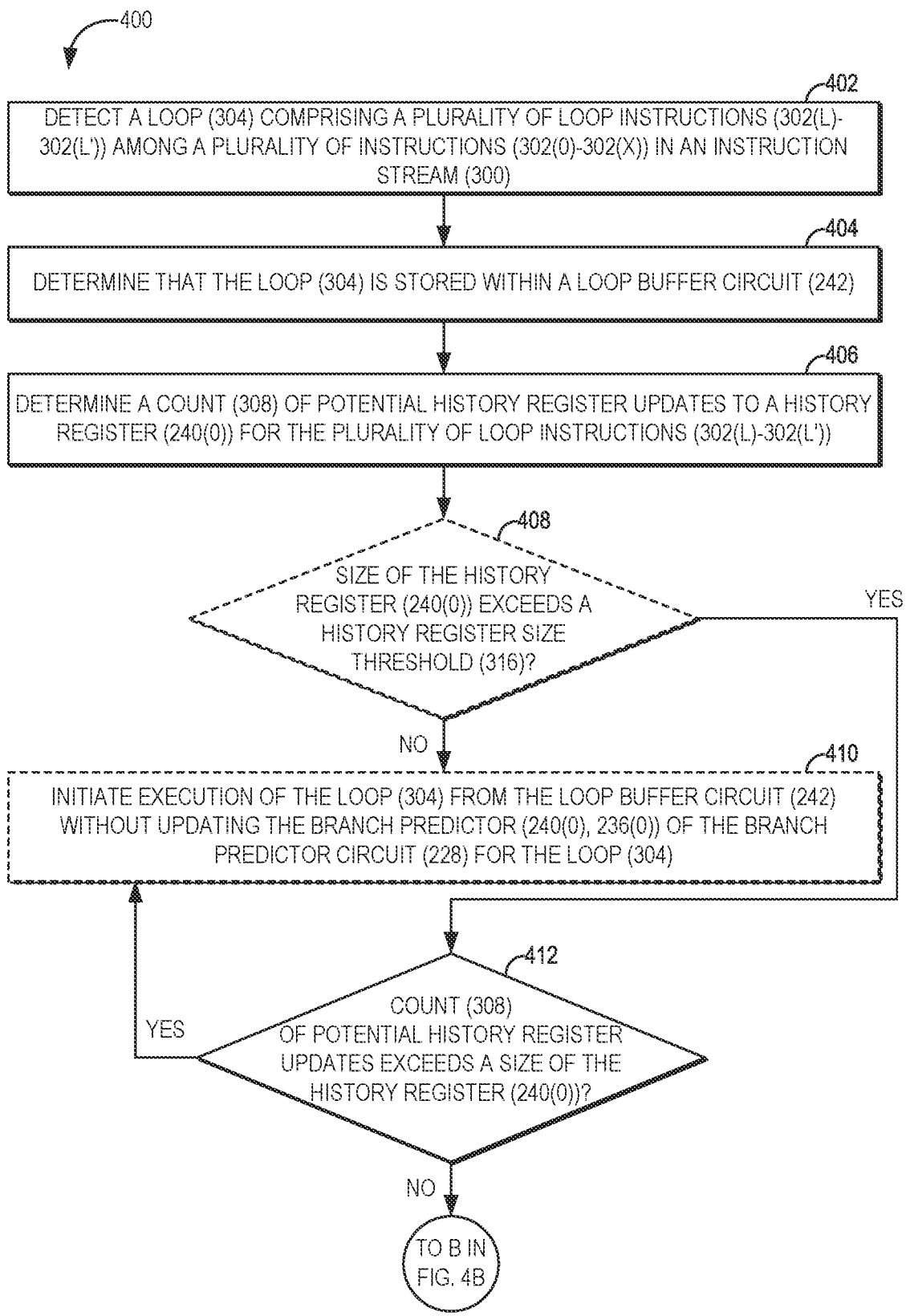
FIGS. 4A and 4B are flowcharts illustrating exemplary operations performed by the branch predictor update circuit of FIGS. 2 and 3 for selectively updating branch predictors for loops executed from loop buffers.
Figure 4B:
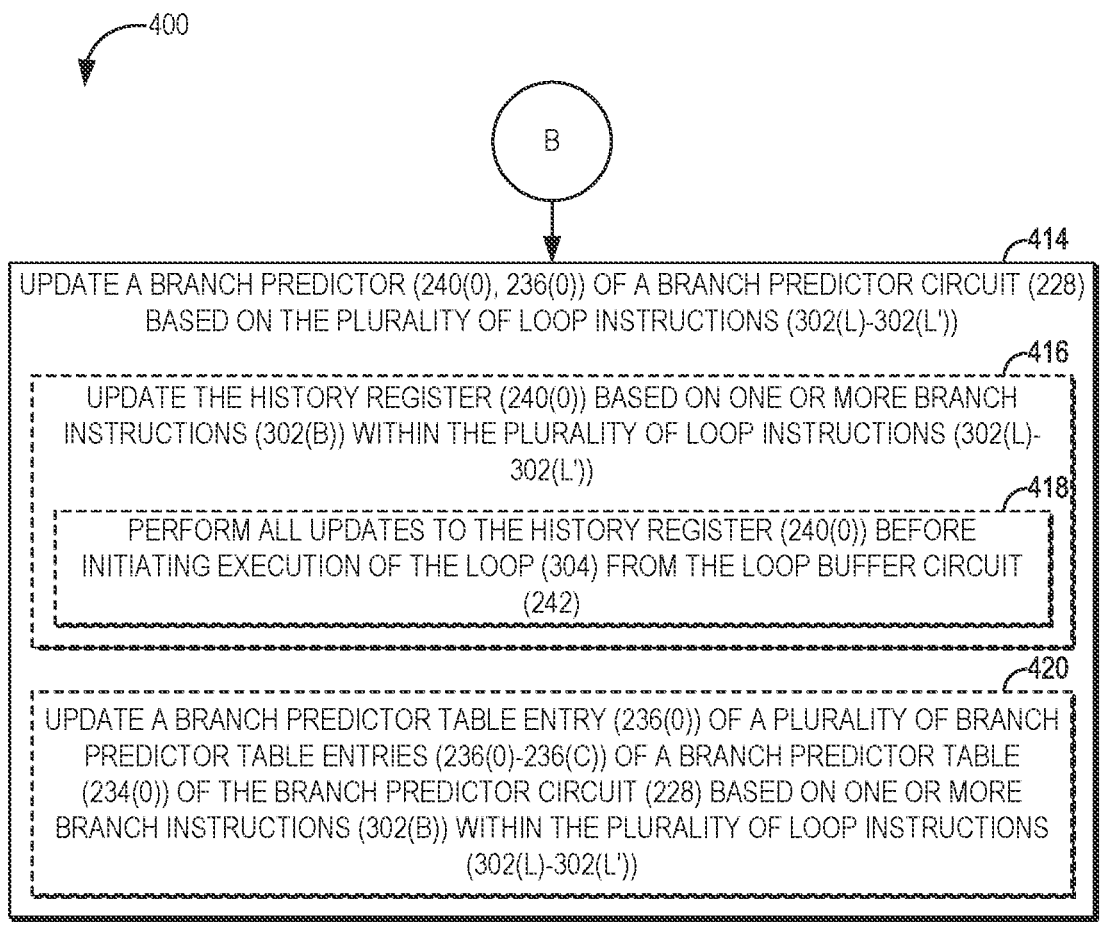

To illustrate exemplary operations performed by the branch predictor update circuit 250 of FIGS. 2 and 3 according to some aspects, FIGS. 4A and 4B provide a flowchart 400. Elements of FIGS. 2 and 3 are referenced in describing FIGS. 4A and 4B for the sake of clarity. It is to be understood that some operations illustrated in FIGS. 4A and 4B may be performed in an order other than that shown herein, and/or may be omitted in some aspects. Operations in FIG. 4A begin with a branch predictor update circuit, such as the branch predictor update circuit 250 of FIGS. 2 and 3, detecting a loop (e.g., the loop 304 of FIG. 3), comprising a plurality of loop instructions among a plurality of instructions in an instruction stream (e.g., the plurality of loop instructions 302(L)-302(L') among the plurality of instructions 302(0)-302(X) in the instruction stream 300 of FIG. 3) (block 402). The branch predictor update circuit 250 determines that the loop 304 is stored within a loop buffer circuit, such as the loop buffer circuit 242 of FIG. 3 (block 404). The branch predictor update circuit 250 then determines a count of potential history register updates (e.g., the count 308 of FIG. 3) to a history register (e.g., the history register 240(0) of FIGS. 2 and 3) for the plurality of loop instructions 302(L)-302(L') (block 406). Exemplary operations of block 406 for determining the count 308 of potential history register updates according to some aspects are discussed in greater detail below with respect to FIG. 5.

In some aspects, the branch predictor update circuit 250 may determine whether a size of the history register 240(0) exceeds a history register size threshold, such as the history register size threshold 316 of FIG. 3 (block 408). If so, operations in such aspects continue at block 412. However, if the branch predictor update circuit 250 determines at decision block 408 that the size of the history register 240(0) does not exceed the history register size threshold 316, the branch predictor update circuit 250 initiates execution of the loop 304 from the loop buffer circuit 242 without updating the branch predictor (e.g., the history register 240(0) or the branch predictor table entry 236(0) of FIGS. 2 and 3) of the branch predictor circuit 228 for the loop 304 (block 410).

The branch predictor update circuit 250 next determines whether a count of potential history register updates (e.g., the count 308 of FIG. 3) exceeds the size of the history register 240(0) (block 412). If it is determined at decision block 412 that the count 308 of potential history register updates exceeds the size of the history register 240(0), operations continue at block 410. Otherwise, operations continue at block 414 of FIG. 4B.

Referring now to FIG. 4B, if the branch predictor update circuit 250 determines at decision block 412 that the count 308 of potential history register updates does not exceed the size of the history register 240(0), the branch predictor update circuit 250 updates a branch predictor (e.g., the history register 240(0) or the branch predictor table entry 236(0) of FIGS. 2 and 3) of a branch predictor circuit (e.g., the branch predictor circuit 228 of FIG. 2) based on the plurality of loop instructions 302(L)-302(L') (block 414). In aspects in which the branch predictor is a history register such as the history register 240(0), the operations of block 414 for updating the branch predictor may comprise updating the history register 240(0) based on one or more branch instructions 302(B) within the plurality of loop instructions 302(L)-302(L') (block 416). Some such aspects may provide that the operations of block 416 for updating the history register 240(0) may comprise performing all updates to the history register 240(0) before initiating execution of the loop 304 from the loop buffer circuit 242 (block 418). In aspects in which the branch predictor is a branch predictor table entry such as the branch predictor table entry 236(0), the operations of block 414 for updating the branch predictor may comprise updating the branch predictor table entry 236(0) of the plurality of branch predictor table entries 236(0)-236(C) of the branch predictor table 234(0) of the branch predictor circuit 228 based on one or more branch instructions 302(B) within the plurality of loop instructions 302(L)-302(L') (block 420).

Figure 5:
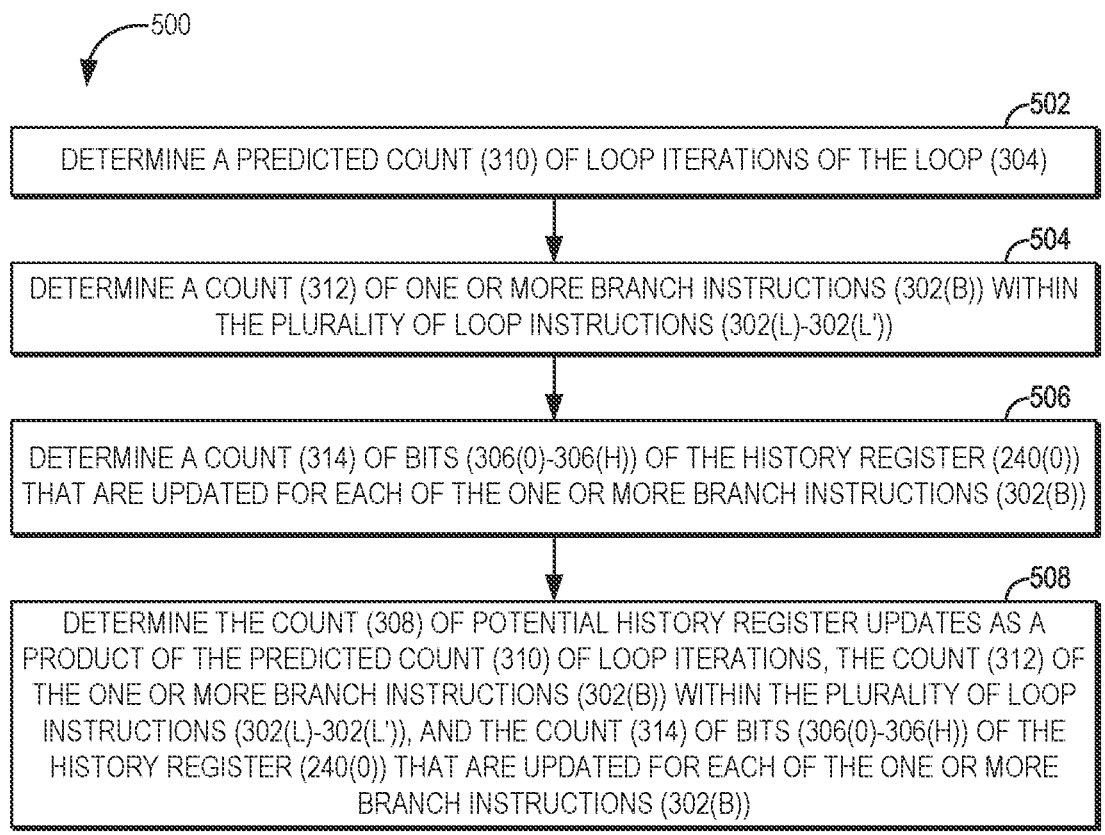
FIG. 5 is a flowchart illustrating exemplary operations for determining a count of potential history register updates by the branch predictor update circuit of FIGS. 2 and 3 according to some aspects.

FIG. 5 provides a flowchart 500 to illustrate in greater detail exemplary operations of block 406 of FIG. 4A for determining the count 308 of potential history register updates according to some aspects. For the sake of clarity, elements of FIGS. 2 and 3 are referenced in describing FIG. 5. In FIG. 5, operations begin with the branch predictor update circuit 250 determining a predicted count of loop iterations of the loop 304 (e.g., the predicted count 310 of FIG. 3) (block 502). The branch predictor update circuit 250 also determines a count of one or more branch instructions 302(B) within the plurality of loop instructions 302(L)-302(L') (e.g., the count 312 of FIG. 3) (block 504). The branch predictor update circuit 250 also determines a count of bits 306(0)-306(H) of the history register 240(0) that are updated for each of the one or more branch instructions 302(B) (e.g., the count 314 of FIG. 3) (block 506). Finally, the branch predictor update circuit 250 determines the count 308 of potential history register updates as a product of predicted count 310 of loop iterations, the count 312 of the one or more branch instructions 302(B) within the plurality of loop instructions 302(L)-302(L'), and the count 314 of bits 306(0)-306(H) of the history register 240(0) that are updated for each of the one or more branch instructions 302(B) (block 508).

Some aspects may provide that the branch predictor update circuit 250, before performing the operations of block 414 for updating the branch predictor, applies additional logic in determining how many updates to the branch predictor should be made. In this regard, FIG. 6 provides a flowchart 600 to illustrate exemplary operations performed by the branch predictor update circuit 250. Elements of FIGS. 2 and 3 are referenced in describing FIG. 6 for the sake of clarity. Operations in FIG. 6 begin with the branch predictor update circuit 250, after determining a count of potential history register updates (e.g., the count 308 of FIG. 3), determining whether the count 308 of potential history register updates exceeds an update count threshold (e.g., the update count threshold 318 of FIG. 3) (block 602). If so, the branch predictor update circuit 250 updates the branch predictor 240(0), 236(0) of the branch predictor circuit 228 for only a subset of the potential history register updates (block 604). However, if the branch predictor update circuit 250 determines at decision block 602 that the count 308 of potential history register updates does not exceed the update count threshold 318, the branch predictor update circuit 250 updates the branch predictor 240(0), 236(0) for each of the potential history register updates (block 606).

FIG. 7 is a block diagram of an exemplary processor-based system 700 that includes a processor 702 (e.g., a microprocessor) that includes an instruction processing circuit 704 that comprises a branch predictor update circuit (captioned "BPUC" in FIG. 7) 706 that corresponds in functionality to the branch predictor update circuit 250 of FIG. 2. The instruction processing circuit 704 can be the instruction processing circuit 204 in the processor 202 in FIG. 2 as an example. The processor-based system 700 can be the processor-based system 200 in FIG. 2 as an example. The processor-based system 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer.

In this example, the processor 702 represents one or more general-purpose processing circuits, such as a microprocessor, central processing unit, or the like. The processor 702 is configured to execute processing logic in instructions for performing the operations and steps discussed herein. In this example, the processor 702 includes an instruction cache 708 for temporary, fast access memory storage of instructions accessible by the instruction processing circuit 704. Fetched or prefetched instructions from a memory, such as from the system memory 710 over a system bus 712, are stored in the instruction cache 708. The instruction processing circuit 704 is configured to process instructions fetched into the instruction cache 708 and process the instructions for execution.

The processor 702 and the system memory 710 are coupled to the system bus 712 and can intercouple peripheral devices included in the processor-based system 700. As is well known, the processor 702 communicates with these other devices by exchanging address, control, and data information over the system bus 712. For example, the processor 702 can communicate bus transaction requests to a memory controller 714 in the system memory 710 as an example of a slave device. Although not illustrated in FIG. 7, multiple system buses 712 could be provided, wherein each system bus constitutes a different fabric. In this example, the memory controller 714 is configured to provide memory access requests to a memory array 716 in the system memory 710. The memory array 716 is comprised of an array of storage bit cells for storing data. The system memory 710 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 712. As illustrated in FIG. 7, these devices can include the system memory 710, one or more input device(s) 718, one or more output device(s) 720, a modem 722, and one or more display controllers 724, as examples. The input device(s) 718 can include any type of input device, including but not limited to input keys, switches, voice processors, etc. The output device(s) 720 can include any type of output device, including but not limited to audio, video, other visual indicators, etc. The modem 722 can be any device configured to allow exchange of data to and from a network 726. The network 726 can be any type of network, including but not limited to a wired or wireless network, a private or public network, a local area network (LAN), a wireless local area network (WLAN), a wide area network (WAN), a BLUETOOTH™ network, and the Internet. The modem 722 can be configured to support any type of communications protocol desired. The processor 702 may also be configured to access the display controller(s) 724 over the system bus 712 to control information sent to one or more displays 728. The display(s) 728 can include any type of display, including but not limited to a cathode ray tube (CRT), a liquid crystal display (LCD), a plasma display, etc.

The processor-based system 700 in FIG. 7 may include a set of instructions 730 to be executed by the processor 702 for any application desired according to the instructions. The instructions 730 may be stored in the system memory 710, processor 702, and/or instruction cache 708 as examples of a non-transitory computer-readable medium. The instructions 730 may also reside, completely or at least partially, within the system memory 710 and/or within the processor 702 during their execution. The instructions 730 may further be transmitted or received over the network 726 via the modem 722.

While the computer-readable medium is described herein in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor, comprising:
an instruction processing circuit configured to process an instruction stream comprising a plurality of instructions in an instruction pipeline, the instruction processing circuit comprising:
a branch predictor circuit comprising a history register; and
a branch predictor update circuit configured to:
detect a loop comprising a plurality of loop instructions among the plurality of instructions in the instruction stream;
determine that the loop is stored within a loop buffer circuit of the processor;
determine a count of potential history register updates to the history register for the plurality of loop instructions;
determine whether the count of potential history register updates exceeds a size of the history register; and responsive to determining that the count of potential history register updates does not exceed the size of the history register, update a branch predictor of the branch predictor circuit based on the plurality of loop instructions.

2. The processor of claim 1, wherein the branch predictor update circuit is configured to determine the count of potential history register updates by being configured to:
determine a predicted count of loop iterations of the loop;
determine a count of one or more branch instructions within the plurality of loop instructions;
determine a count of bits of the history register that are updated for each of the one or more branch instructions; and
determine the count of potential history register updates as a product of the predicted count of loop iterations, the count of the one or more branch instructions within the plurality of loop instructions, and the count of bits of the history register that are updated for each of the one or more branch instructions.

3. The processor of claim 1, wherein:
the branch predictor comprises the history register; and
the branch predictor update circuit is configured to update the branch predictor by being configured to update the history register based on one or more branch instructions within the plurality of loop instructions.

4. The processor of claim 3, wherein the branch predictor update circuit is configured to update the history register based on the one or more branch instructions within the plurality of loop instructions by being configured to perform all updates to the history register before initiating execution of the loop from the loop buffer circuit.

5. The processor of claim 1, wherein:
the branch predictor comprises a branch predictor table entry of a plurality of branch predictor table entries of a branch predictor table of the branch predictor circuit; and
the branch predictor update circuit is configured to update the branch predictor by being configured to update the branch predictor table entry based on one or more branch instructions within the plurality of loop instructions.

6. The processor of claim 1, wherein:
the branch predictor circuit comprises a plurality of branch predictor tables and a corresponding plurality of history registers including the history register;
the branch predictor update circuit is further configured to determine whether the size of the history register exceeds a history register size threshold; and
the branch predictor update circuit is configured to update the branch predictor of the branch predictor circuit based on the plurality of loop instructions further responsive to determining that the size of the history register exceeds the history register size threshold.

7. The processor of claim 1, wherein:
the branch predictor update circuit is further configured to determine whether the count of potential history register updates exceeds an update count threshold; and
the branch predictor update circuit is configured to update the branch predictor of the branch predictor circuit based on the plurality of loop instructions by being configured to update the branch predictor of the branch predictor circuit for only a subset of the potential history register updates, further responsive to determining that the count of potential history register updates exceeds the update count threshold.

8. The processor of claim 7, wherein the subset of the potential history register updates is determined by the equation $x+\log_{10}n-\log_{10}x$, where x is a non-zero integer representing the update count threshold and n is a non-zero integer representing a count of potential history register updates.

9. The processor of claim 1, wherein the branch predictor update circuit is further configured to, responsive to determining that the count of potential history register updates exceeds the size of the history register, initiate execution of the loop from the loop buffer circuit without updating the branch predictor of the branch predictor circuit for the loop.

10. A method, comprising:
detecting a loop comprising a plurality of loop instructions among a plurality of instructions in an instruction stream;
determining that the loop is stored within a loop buffer circuit;
determining a count of potential history register updates to a history register for the plurality of loop instructions;
determining whether the count of potential history register updates exceeds a size of the history register; and
responsive to determining that the count of potential history register updates does not exceed the size of the history register, updating a branch predictor of a branch predictor circuit based on the plurality of loop instructions.

11. The method of claim 10, wherein determining the count of potential history register updates comprises:
determining a predicted count of loop iterations of the loop;
determining a count of one or more branch instructions within the plurality of loop instructions;
determining a count of bits of the history register that are updated for each of the one or more branch instructions; and
determining the count of potential history register updates as a product of the predicted count of loop iterations, the count of the one or more branch instructions within the plurality of loop instructions, and the count of bits of the history register that are updated for each of the one or more branch instructions.

12. The method of claim 10, wherein:
the branch predictor comprises the history register; and
updating the branch predictor comprises updating the history register based on one or more branch instructions within the plurality of loop instructions.

13. The method of claim 12, wherein updating the history register based on the one or more branch instructions within the plurality of loop instructions comprises performing all updates to the history register before initiating execution of the loop from the loop buffer circuit.

14. The method of claim 10, wherein updating the branch predictor comprises updating a branch predictor table entry of a plurality of branch predictor table entries of a branch predictor table of the branch predictor circuit based on one or more branch instructions within the plurality of loop instructions.

15. The method of claim 10, further comprising determining whether the size of the history register exceeds a history register size threshold;
wherein updating the branch predictor of the branch predictor circuit based on the plurality of loop instructions is further responsive to determining that the size of the history register exceeds the history register size threshold.

16. The method of claim 10, further comprising:
determining that the count of potential history register updates exceeds an update count threshold;
wherein updating the branch predictor of the branch predictor circuit based on the plurality of loop instructions comprises updating the branch predictor of the branch predictor circuit for only a subset of the potential history register updates, further responsive to determining that the count of potential history register updates exceeds the update count threshold.

17. The method of claim 16, wherein the subset of the potential history register updates is determined by the equation $x+\log_{10}n-\log_{10}x$, where x is a non-zero integer representing the update count threshold and n is a non-zero integer representing a count of potential history register updates.

18. A non-transitory computer-readable medium having stored thereon computer-executable instructions that, when executed, cause a processor to:
detect a loop comprising a plurality of loop instructions among a plurality of instructions in an instruction stream;
determine that the loop is stored within a loop buffer circuit of the processor;
determine a count of potential history register updates to a history register for the plurality of loop instructions;
determine whether the count of potential history register updates exceeds a size of the history register; and
responsive to determining that the count of potential history register updates does not exceed the size of the history register, update a branch predictor of a branch predictor circuit based on the plurality of loop instructions.

19. The non-transitory computer-readable medium of claim 18, wherein the computer-executable instructions cause the processor to determine the count of potential history register updates by causing the processor to:
determine a predicted count of loop iterations of the loop;
determine a count of one or more branch instructions within the plurality of loop instructions;
determine a count of bits of the history register that are updated for each of the one or more branch instructions; and
determine the count of potential history register updates as a product of the predicted count of loop iterations, the count of the one or more branch instructions within the plurality of loop instructions, and the count of bits of the history register that are updated for each of the one or more branch instructions.

20. The non-transitory computer-readable medium of claim 18, wherein the computer-executable instructions further cause the processor to, responsive to determining that the count of potential history register updates exceeds the size of the history register, initiate execution of the loop from the loop buffer circuit without updating the branch predictor of the branch predictor circuit for the loop.

\* \* \* \* \*